United States Patent [19]

Suzuki et al.

[11] Patent Number: 4,697,883
[45] Date of Patent: Oct. 6, 1987

[54] CONTROL APPARATUS FOR TWO SECTION, GLARE SHIELD MIRROR

[75] Inventors: Yasutoshi Suzuki; Hiroshi Itoh, both of Obu; Shinya Ohmi, Anjo; Kunihiko Hara, Aichi, all of Japan

[73] Assignee: Nippondenso Co., Ltd., Kariya, Japan

[21] Appl. No.: 768,150

[22] Filed: Aug. 22, 1985

[30] Foreign Application Priority Data

Aug. 30, 1984 [JP] Japan .................. 59-182275

[51] Int. Cl.$^4$ .............. G02B 17/00; G02F 1/13
[52] U.S. Cl. ................ 350/331 R; 350/279; 350/283; 350/332
[58] Field of Search ........ 350/331 R, 332, 336, 350/338, 342, 278–283

[56] References Cited

U.S. PATENT DOCUMENTS

| 3,862,798 | 1/1975 | Hopkins | 350/331 R X |
| 4,623,222 | 11/1986 | Itoh et al. | 350/338 X |
| 4,632,509 | 12/1986 | Ohmi et al. | 350/278 |

FOREIGN PATENT DOCUMENTS

| 2808260 | 8/1979 | Fed. Rep. of Germany | 350/283 |
| 55-13167 | 3/1980 | Japan |  |
| 84/00010 | 1/1984 | PCT Int'l Appl. |  |
| 2029343 | 3/1980 | United Kingdom | 350/331 R |
| 85/03136 | 7/1985 | PCT Int'l Appl. | 350/278 |

Primary Examiner—John K. Corbin
Assistant Examiner—David Lewis
Attorney, Agent, or Firm—Cushman, Darby & Cushman

[57] ABSTRACT

A control apparatus for controlling the glare shield of a reflecting mirror of a vehicle, wherein the reflecting mirror is provided with on the upper half and lower half portions respectively first and second electro-optic elements whose transmittance of light being variable, and when a first photo detecting circuit determines that incident light on the reflecting mirror detected by an incident light detector is the direct sunlight, a first control circuit applies a voltage to the first electro-optic element to cause the upper half portion of the reflecting mirror to become a glare shield condition, and when a second photo detecting circuit determines that the incident light detected by an incident light detector is light of a headlight of a following vehicle, a second control circuit applies the voltage to the second electro-optic element to cause the lower half portion of the reflecting mirror to become the glare shield condition.

7 Claims, 7 Drawing Figures

CONTROL APPARATUS FOR TWO SECTION, GLARE SHIELD MIRROR

The present invention relates to a glare shield type reflecting mirror control apparatus for controlling light reflectance of a reflecting mirror electrically by utilizing a variation in an optical characteristic of an electro-optic element with respect to an applied voltage, and is applicable as a reflecting mirror to a room mirror, side mirror and the like for vehicles.

A conventional glare shield type reflecting mirror employing an electro-optic element of a liquid crystal, electrochromic material or the like involves a difficulty in obtaining clear backward field of view, because a glare shield section which is capable of performing glare shield action is formed over the whole front surface of the reflecting mirror, and the reflectance of light becomes too small when the glare shield action is being performed.

However, dazzling for the driver by indicent light from behind is due to a spot-like light source projected on a portion of the glare shield type reflecting mirror, and he is not necessarily dazzled by reflected light from the front surface of the reflecting mirror. During a drive of a vehicle in the night, a portion of a back mirror or a side mirror on which light of a head lamp of a following vehicle is projected is concentrated on the lower half of the reflecting mirror, and it is rarely projected on the upper half of the reflecting mirror.

The inventors of the present application, bearing the above-mentioned empirical reules in mind, conceived that the dazzling for the driver is prevented by providing glare shield on at least the lower half portion of the reflecting mirror, and the following vehicle can be seen clearly by the reflecting mirror even when the glare shield action is being performed. This concept was proposed in the earliar Japanese Patent Application No. 58-248579 (1983).

This concept can surely achieve the glare shield effectively against the light of the headlight of the following vehicle, and can make clear the backward field of view by the upper half portion of the reflecting mirror. However, it was found that the glare shield can not be achieved effectively against the direct sunlight in the morning and evening. In orher words, the direct sunlight in the morning and evening concentrates on the upper half of the reflecting mirror, and the sunlight is seldom projected onto the lower half portion of the reflecting mirror. Irrespective of this, since the upper half portion of the reflecting mirror is formed as the glare shield portion in the proposal in the above-mentioned Japanese patent application, there is a problem in that the glare shield can not be achieved against the direct sunlight in the morning and evening.

The present invention was made in view of the aforementioned situation, and it is aimed to achieve the glare shield effectively against the light of the headlight of the following vehicle during a drive in the night, and at the same time, to make clear the backward field of view, and further, to enable to achieve the glare shield effectively atainst the direct sunlight in the morning and evening.

The present invention, in order to solve the problem mentioned above, provides a glare shield type reflecting mirror control apparatus for controlling glare shield of a reflecting mirror which has first and second electro-optic elements on upper half and lower half portions of a reflecting mirror layer respectively, the transmittance of the first and second electro-optic elements being varied in accordance with an applied voltage, the glare shield type reflecting mirror control apparatus comprising:

incident light detecting means for detecting light incident on the reflecting mirror from behind a vehicle;

first determining means for determining whether the incident light detected by the incident light detecting means is light corresponding to the direct sunlight or not;

second determining means for determining whether the incident light detected by the incident light detecting means is light stronger than light corresponding to light of a headlight of a following vehicle or not, day and night determining means for determining the day or the night;

first control means, upon determination by the first determining means that the incident light is the light corresponding to the direct sulight, for applying a voltage to at least the first electro-optic element to cause the upper half portion of the reflecting mirror to become a glare shield condition; and second control means, upon determination by the second determining means that the incident light is the light stronger than the light corresponding to the light of the headlight of the following vehicle and upon determination by the day and night determining means that it is the nighttime, for applying the voltage to only the second electro-optic element of the first and second electro-optic elements to cause the lower half portion of the reflecting mirror to become the glare shield condition.

In the glare shield type reflecting mirror control apparatus arranged as described above, during a drive in the night, when the light of the headlight of the following vehicle impinges on the reflecting mirror, this condition is determined by the second determining means, and since the nighttime is determined by the day and night determining means, the second control means applies the voltage only to the second electro-optic element to cause the lower half portion of the reflecting mirror to become the glare shield condition, and further, when the direct sunlight in the morning or evening impinges on the reflecting mirror, this condition is determined by the first determining means, and the first control means applies the voltage to at least the first electro-optic element to cause the upper half portion of the reflecting mirror to become the glare shield condition.

The present invention is arranged and acts as described in the foregoing, and provides advantageous effects in that during a drive in the night, by causing only the lower half portion of the reflecting mirror to become the glare shield condition, the driver is not dazzled by the light of the headlight of the following vehicle, and at the same time, the backward field of view can be made clear by the upper half portion of the reflecting mirror, and further, against the direct sunlight in the morning and evening, at least the upper half of the reflecting mirror is caused to become the glare shield condition, and thus the dazzling by the direct sunlight can be removed.

The present invention will be described with respect to the embodiments shown in the drawings, in which.

Figure 1:
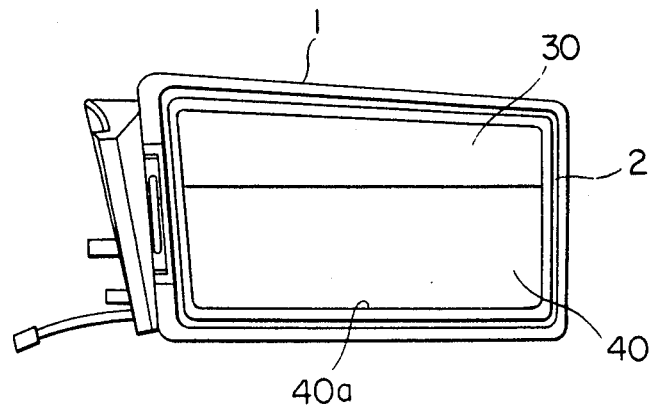
FIG. 1 is a plan view of a glare shield type eflecting mirror according to a first embodiment of the present invention.
Figure 2:
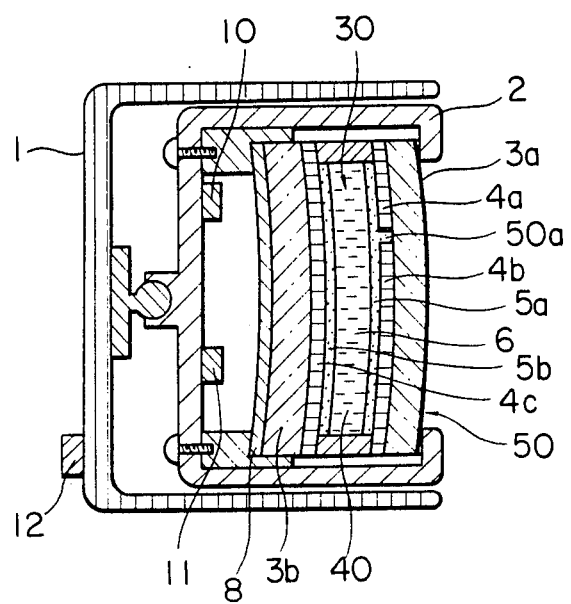
FIG. 2 is a vertical cross-sectional view of the reflecting mirror of FIG. 1.

With reference to FIGS. 1 and 2, FIG. 1 is a plan view of a glare-shield type reflecting mirror according to a a first embodiment of the present invention, and FIG. 2 is a vertical cross-sectional view of the reflecting mirror. The glare sield type reflecting mirror has a frame body 2 and a supporting rest 1 for supporting the frame body 2. The frame body 2 holds a liquid crystal element 50. The liquid crystal element 50, viewing from the front thereof, has a lower side end 40a, a second glare shield section 40 in a range of ⅔ of the hight of the liquid crystal element 50, and a first glare shield section 30 in the rest portion, that is, in an upper half portion. These first and second glare shield sections are formed integrally. The liquid crystal element 50 has in an order from the end surface of the incident side, a transparent glass substrate 3a, a transparent electrode layer 4a formed by ITO, an orientation film 5a for orientating the liquid cyrstal in parallel, a liquid crystal layer 6 formed by a nematic liquid crystal which generates DSM, an orientation film 5b, a transparent electrode layer 4b, a transparent glass substrate 3b, and a semi-transparent mirror layer 8. The glare shield section of the liquid crystal element 50 is arranged to cause dynamic scattering by applying a voltage, and to control electrically the reflectance of light of the reflecting mirror as a whole by controlling the transmittance in the liquid crystal layer 6 by the scattering. A thickness of the transparent electrode layers 4a, 4b used in the liquid crystal element 50 is 1000 Å, and a film thickness of the orientation films 5a, 5b is 1000 Å. Further, a thickness of the liquid crystal layer 6 is 10 μm. Furhter, the semitransparent mirror layer 8 is formed by aluminum and has a thickness of 300 Å.

In such a liquid crystal element 50, in order to separate between the first glare shield section 30 and the second glare shield section 40, a groove 50a is provided in the transparent electrode layer 4a.

Further, on the rear of the liquid crystal element 50, there are provided with a first photodiode 10 as a first photosensor to detect light transmitted through the first glare shield section 30 and the semi-transparent mirror layer 8, and a second photodiode 11 as a second photosensor to detect light transmitted through the second glare shield section 40 and the semi-transparent mirror layer 8. Further, on the rear of the supporting rest 1, there is provided with a third photodiode 12 as a surrounding light sensor to detect surrounding light.

Figure 3:
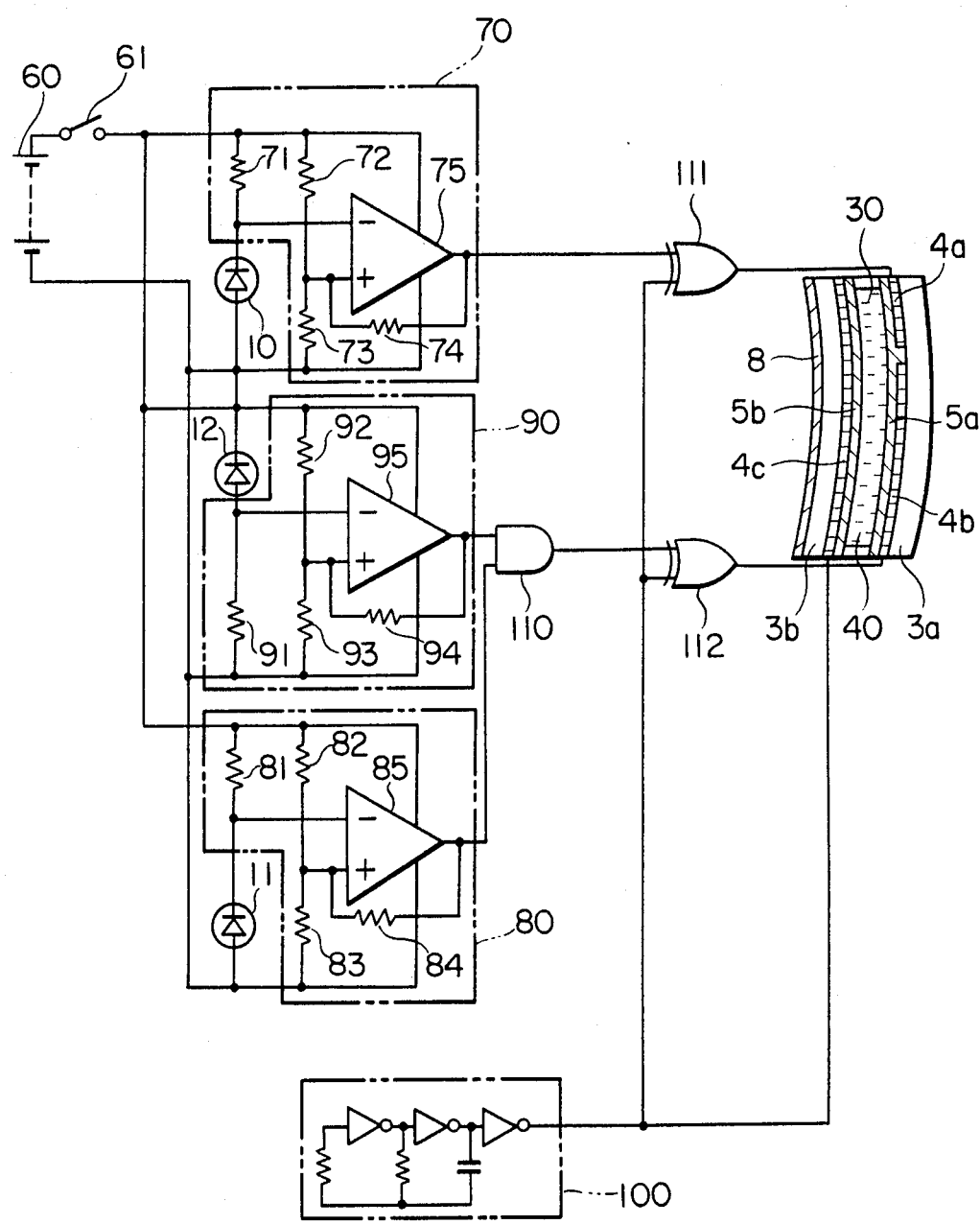
FIG. 3 is a detailed electrical wiring diagram of a circuit of electrically controlling the glare shield type reflecting mirror of FIGS. 1 and 2.

FIG. 3 is a detailed electrical wiring diagram of a circuit to control electrically the glare shield type reflecting mirror mentioned above.

In FIG. 3, reference numeral 60 designates a vehicle-equipped battery, and 61 designates an ignition switch, and by turning on the ignition switch 61, each portion of the circuit of FIG. 3 is supplied with electric power from the vehicle-equipped battery 60.

Reference numeral 70 designates a direct sunlight detecting circuit as first determining means, and it is comprised of resistors 71, 72, 73 and 74 and a comparator 75, and when the direct sunlight is detected by the first photodiode 10, a voltage at the junction point between the resistor 71 and the first photodiode 10 falls below a reference voltage produced by the resistors 72 and 73, and a high level voltage is outputted from the comparator 75.

Reference numeral 80 designates a back light detecting circuit as second determining means, and it is comprised of resistors 81, 82, 83 and 84 and a comparator 85, and when light of a headlight of a following vehicle is detected by the second photodiode 11, a voltage at the junction point between the resistor 81 and the second photodiode 11 falls belows a reference voltage produced by the resistors 82 and 83, and a high level voltage is outputted from the comparator 85.

Reference numeral 90 designates a day and night determining circuit, and it is comprised of resistors 91, 92, 93 and 94 and a comparator 95, and in the nighttime, a voltage at the junction point between the third photodiode 12 and the resistor 91 falls bellow a reference voltage produced by the resistors 92 and 93, and a high level voltage is outputted from the comparator 95.

Reference numberal 100 designates an oscillation circuit for generating an oscillation signal of a predetermined frequency, numeral 110 designates an AND circuit, and numerals 111 and 112 designate exclusive-OR circuits respectively. The oscillation signal from the oscillation circuit 100 is applied to the transparent electrode layer 4c, and at the same time, is applied to one input of each of the exclusive-OR circuits 111 and 112. The output signals of the exclusive-OR circuits 111 and 112 are respectively applied to a transparent electrode layers 4a and 4b.

In this respect, the resistors 74, 84 and 94 are formed by hysteresis resistors, and in particular, with respect to the resistors 74 and 84, since the amount of light reaching the first and second photodiodes 10 and 11 is varied due to the glare shield effected by the first and second glare shield sections 30 and 40, a hysteresis width of the resistors 74 and 84 is determined taking the degree of decrease in the amount of light into account.

In the arrangement mentioned above, the operation will be described.

Now, during a drive in the daytime, and when the direct sunlight does not impinge can the reflecting mirror, the output voltage from the direct sunlight detecting circuit 70 becomes a low level, and also, the output from the day and night determining circuit 9 is at the low level. Accordingly, one input of each of the exclusive-OR circuits 111 and 112 becomes the low level, and each of the exclusive-OR circuits 111 and 112 outputs the oscillation signal from the oscillation circuit 100 as it is, which oscillation signal is the other input to the exclusive-OR circuits 111 and 112. Consequently, no voltage is applied between the transparent electrode layers 4a and 4c and between the transparent electrode layers 4b and 4c, and thus the reflecting mirror does not operate to provide the glare shield.

On the other hand, when the vehicle is driving in the nighttime, the output from the day and night determining circuit 90 goes to a high level. And at this time, when the light of a headlight of a following vehicle impinges on the second photodiode 11, the output of the back light detecting circuit 80 becomes the high level, and the output of the AND circuit 110 also becomes the high level. As a result, the output of the exclusive-OR circuit 112 is an inverted oscillation signal with respect to the oscillation signal from the oscillation circuit 100. Therefore, a voltage is applied between the transparent electrode layers 4b and 4c, and the second glare shield section 40 becomes the glare shield condition. By virtue of this condition, the dazzling by the light of the headlight of the following vehicle can be removed. Further, since the output of the direct sunlight detecting circuit 70 is at the low level and the first glare shield section 30 does not assume the galre shield condition, the backward field of view can be made clear.

Further, when the vehicle is driving in the morning or evening, and when the direct sunlight impinges on the first photodiode 10, the output from the direct sunlight detecting circuit 70 becomes high level. Thus, the couput of the exclusive OR circuit 111 is an inverted oscillation signal with respect to the oscillation signal of the oscillation circuit 100, and the voltage is applied between the transparent electrode layers 4a and 4c. Further, since the output of the day and night determining circuit 90 is at the low level, no voltage is applied between the transparent electrode layers 4b and 4c. As a result, only the first glare shield section 30 assumes the glare shield condition, and the dazzling by the direct sunlight can be removed.

Figure 4:
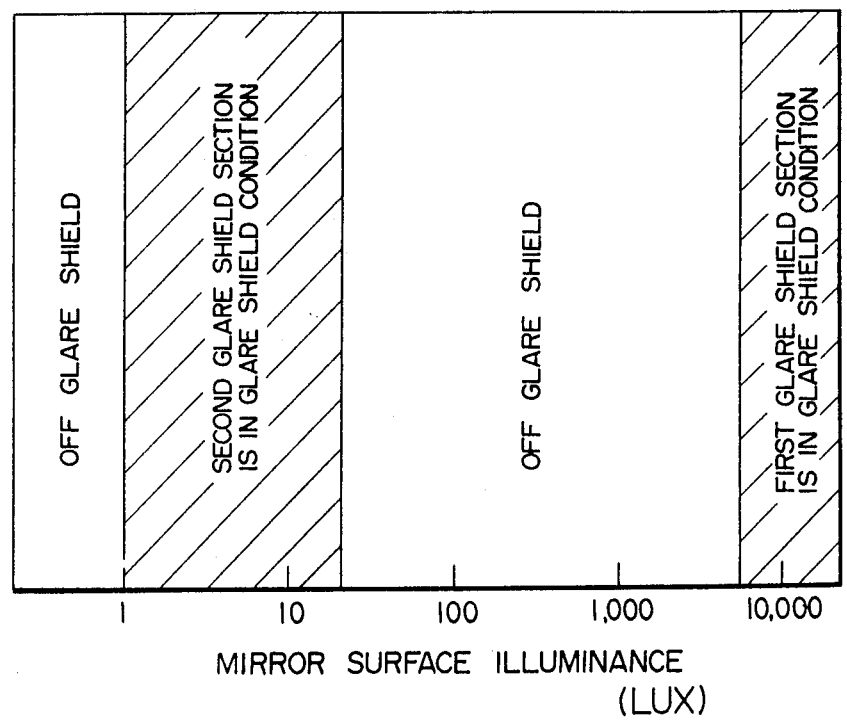
FIG. 4 is an explanatory diagram showing a glare shield condition with respect to the mirror surface illuminance.
Figure 5:
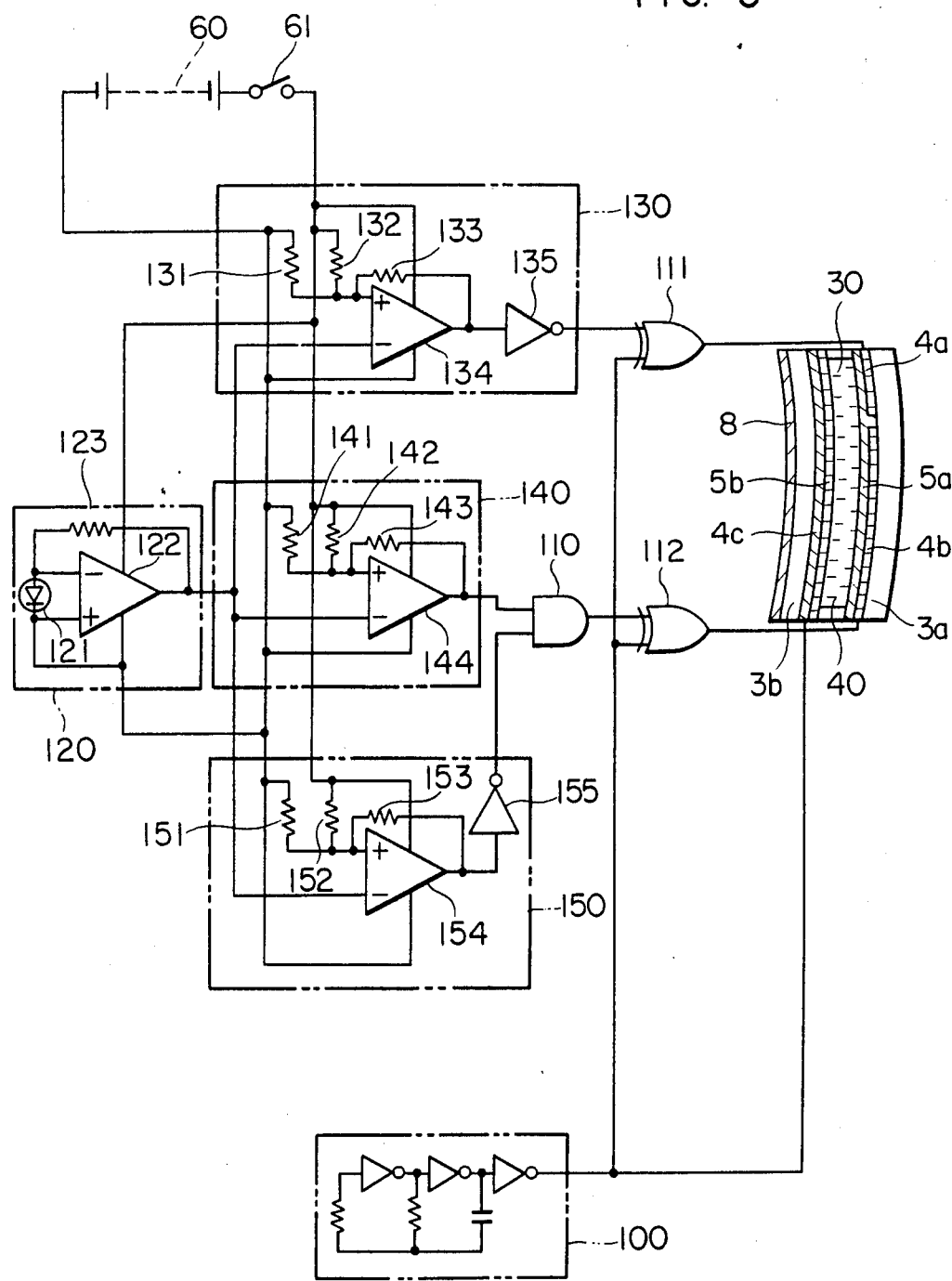
FIG. 5 is an electrical wiring diagram showing a second embodiment of the present invention.
Figure 6:
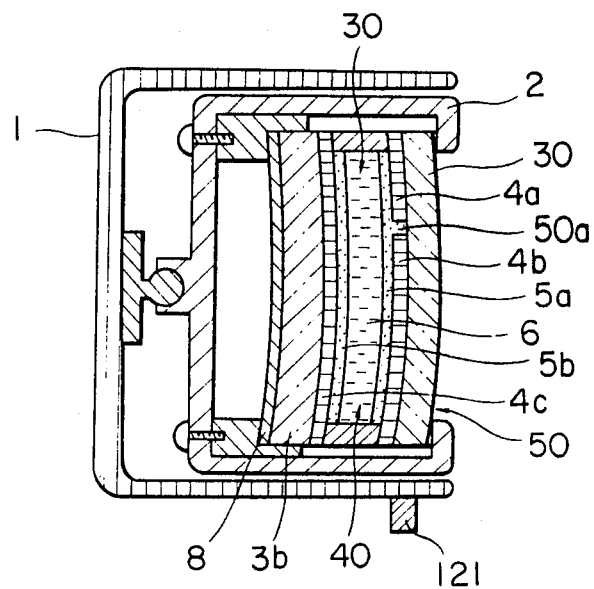
FIG. 6 is a vertical cross-sectional view of a glare shield type reflecting mirror according to the second embodiment.

In the embdoiment described in the foregoing, switching points of the outputs of the respective circuits 70, 80 and 90 by the first, second, and third photodiodes 10, 11 and 12 are respectively 1 lux, 10 lux and $10^4$ lux or so in the mirror surface illuminance, and accordingly, it is possible to use these photodiodes commonly. In other words, as shown in FIG. 4, the first and second glare shield sections 30 and 40 can be controlled such that both sections 30 and 40 are "OFF" glare shield when the illuminance is 1 lux or less, only the second glare shield section 40 is in the glare shield condition when the illuminance is in a range from 1 to 20 lux, both sections 30 and 40 are "OFF" glare shield when the illuminance is in a range from 20 to 7000 lux, and only the first glare shield section 30 is in the glare shield condition when the illuminance is 7000 lux or more. Further, by doing so, although, in the example of FIG. 3, three points are required to be adjusted due to the non-uniformity in the sensitivity of the sensors, in this example the adjustment of only one point is needed, and thus the adjustment is easy. FIG. 5 is a concrete electrical-wiring diagram of such an embodiment. In FIG. 5, a single photodiode 121 is mounted on the outer side of the front of a reflecting mirror, and detects light from the back of the vehicle. A photo detecting circuit 120 is comprised of the photodiode 121, an operational amplifier 122 and a resistor 123, and converts a photo current of the photodiode 121 proportional to the intensity of the incident light into a voltage. The output of the photo detecting circuit 120 is connected to a direct sunlight detecting circuit 130, a day and night determining circuit 140, and a back light detecting circuit 150. The direct sunlight detecting circuit 130 includes resistors 131, 132 and 133, a comparator 134, and an inverter 135, and generates a voltage of a high level upon receiving an output from the photo detecting circuit 120 at the time when the photodiode 121 detects light of the mirror surface illuminance of 7000 lux or more. The day and night determining circuit 140 includes resistors 141, 142 and 143, and a comparator 144, and generates a voltage of the high level upon receiving an output from the photo detecting circuit 120 at the time when the photodiode 121 detects light of the mirror surface illuminance of 20 lux or less. The back light detecting circuit 150 includes resistors 151, 152 and 153, a comparator 154, and an inverter 155, and generates a voltage of the high level upon receiving an output from the photo detecting circuit 120 at the time when the photodiode 121 detects light of the mirror surface illuminance of 1 lux or more.

Accordingly, when there is no following vehicle and the photodiode 121 is detecting the light of the mirror surface illuminance of 1 lux or less, the output of the direct sunlight detecting circuit 130 assumes a low level, and the output of the day and night determining circuit 140 goes to the high level, and the output of the back light detecting circuit 150 goes to the low level. Consequently, one input of each of the exclusive-OR circuits 111 and 112 becomes low level, and thus no voltage is applied between the transparent electrode layers 4a and 4c and between the transparent electrode layers 4b and 4c of the reflecting mirror, and the reflecting mirror does not perform the glare shield operation. However, when the mirror surface illuminance exceeds 1 lux due to the light of a headlight of a following vehicle, the output of the back light detecting circuit 150 becomes high level upon receiving the output from the photo detecting circuit 120. Consequently, the output of the AND circuit 110 becomes high level, and the output of the exclusive-OR circuit 111 is an inverted oscillation signal with respect to the oscillation signal of the oscillation circuit 100. As a result, a a voltage is applied between the transparent electrode layres 4b and 4c, and the second glare shield section 40 assumes the glare shield condition. Further, when the mirror surface illuminance is in the range from 20 to 7000 lux, it is regarded as a daytime driving condition, and either of the outputs of the direct sunlight detecting circuit 130 and the day and night determining circuit 140 becomes low level, and the glare shield operation of the reflecting mirror does not take place. Further, when the mirror surface illuminance becomes 7000 lux or more, it is determined that the direct sunlight is impinging on the reflecting mirror, and the output of the direct sun light detecting circuit 130 becomes high level. As a result, the output of the exclusive-OR circuit 111 becomes an inverted oscillation signal with respect to the oscillation signal of the oscillation circuit 100, and the voltage is applied between the transparent electrode layers 4a and 4c, and thus the first glare shield section 30 assumes the glare shield condition.

Figure 7:
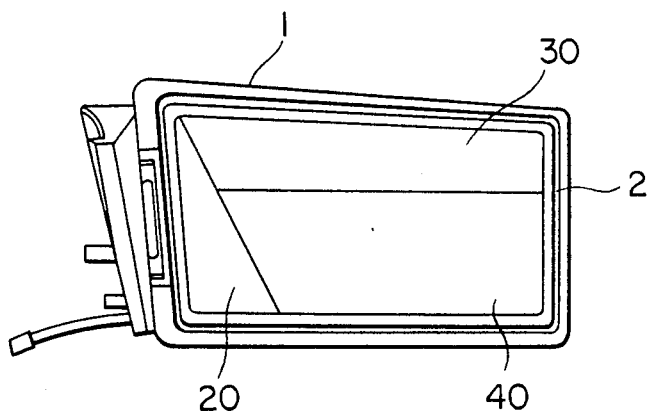
FIG. 7 is a plan view of a glare shield type reflecting mirror showing a third embodiment of the present invention.

FIG. 7 is a plan view showing another embodiment of a glare shield reflecting mirror. In this embodiment, a difference from the embodiments described earlier is that a non-glare shield section 20 is provided. Since this section is a portion of the reflecting mirror on which the side portion of the vehicle is projected, in no case the light of the headlight or the sunlight impinges on this portion directly. Accordingly, by making this portion the non-glare shield section, the driver can always see the side of the vehicle surely, and this portion of the vehicle can be made more clearly visible.

Further, in either of the embodiments described above, although the reflecting mirror is shown as applied to a side mirror, it may be applied to a room mirror. Further, as shown in FIG. 5, when the single photodiode 121 is used for the day and night determination, the back light detection, and the direct sunlight detection, a microcomputer may be used to perform the portions of the day and night determination, the back light detection, and the direct sunlight detection. Furhter, although the day and night determination is described as to the determination based on the surrounding light, the day and night determination may be attained by a light switch which detects a turn-on condition of the headlight of the vehicle. Further, although it is described that only the first glare shield section 30 performs the glare shield, the first and second glare shield sections 30 and 40 may be designed to perform the glare shield.

We claim:

1. A glare shield type reflecting mirror control apparatus of a vehicle for controlling glare shield of a reflecting mirror which has first and second electro-optic elements respectively on upper half and lower half portions of a reflecting mirror layer, the transmittance of light of said first and second electro-optic elements being varied in accordance with an applied voltage, said glare shield type reflecting mirror control apparatus comprising:

incident light detecting means for detecting light incident on said reflecting mirror from behind said vehicle;

first determining means for determining whether the incident light detected by said incident light detecting means is light corresponding to the direct sunlight or not;

second determining means for determining whether the incident light detected by said incident light detecting means is light stronger than light corresponding to light of a headlight of a following vehicle or not;

day and night determining means for determining the day or the night;

first control means, upon determination of said first determining means that the incident light is the light corresponding to the direct sunlight, for applying a voltage to at least said first electro-optic element to cause the upper half portion of said reflecting mirror to become a glare shield condition; and second control means, upon determination by said second determination means that the incident light is the light stronger than the light corresponding to the light of the headlight of the following vehicle and upon determination by said day and night determining means that it is the nighttime, for applying the voltage to only said second electro-optic element of said first and second electro-optic elements to cause the lower half portion of said reflecting mirror to become the glare shield condition.

2. A glare shield type reflecting mirror control apparatus according to claim 1, wherein said incident light detecting means includes first and second photosensors for detecting the light incident on said reflecting mirror from behind said vehicle, and said first determining means determines based on a detection signal from said first photosensor whether the incident light is the direct sunlight or not, and said second determining means determines based on a detection signal from said second photosensor whether the incident light is the light stronger than the light corresponding to the light of the headlight of the following vehicle or not.

3. A glare shield type reflecting mirror control apparatus according to claim 2, wherein said reflecting mirror layer is a semi-transparent mirror layer which transmits a part of the incident light, and said first photosensor detects the light transmitted through said first electro-optic element and said semi-transparent mirror layer, and said second photosensor detects the light which is transmitted through said second electro-optic element and said semi-transparent mirror layer.

4. A glare shield type reflecting mirror control apparatus according to claim 1, wherein said day and night determining means includes a surrounding light sensor for detecting light surrounding said vehicle, and a day and night determining circuit for determining the day or the night based on a detection signal from said surrounding light sensor.

5. A glare shield type reflecting mirror control apparatus according to claim 1, wherein said day and night determining means is a light switch which detects a turn-on condition of the headlight of said vehicle.

6. A glare shield type reflecting mirror control apparatus according to claim 1, wherein said day and night determining means determines the day or the night based on the incident light detected by said incident light detecting means.

7. A glare shield type reflecting mirror control apparatus according to claim 1, wherein said first control means applies the voltage also to said second electro-optic element in addition to said first electro-optic element thereby to cause the upper half portion and the lower half portion to become the glare shield condition.

* * * * *